United States Patent Office 3,313,785
Patented Apr. 11, 1967

3,313,785
POLYSULFONES AND METHOD FOR
THEIR PRODUCTION
Nathan L. Zutty, Charleston, W. Va., assignor to Union
Carbide Corporation, a corporation of New York
No Drawing. Filed June 11, 1963, Ser. No. 286,957
32 Claims. (Cl. 260—79.3)

This invention relates to novel polysulfones and to methods for their production. More particularly this invention relates to novel polysulfones containing polymerized bicyclo[2.2.1]hept-2-ene or derivatives thereof and polymerized sulfur dioxide.

The free-radical polymerization of sulfur dioxide with various olefinically-unsaturated monomers in general, and with bicyclo[2.2.1]hept-2-ene in particular, is well known. However, it was generally found and assumed that some external source of free-radicals, e.g. free-radical catalysts such as oxygen, peroxides or azo compounds, was necessary to effect the polymerization. For example, J. R. Caldwell et al. in U.S. Patent No. 2,899,412, state that the presence of oxygen-yielding, i.e., free-radical, catalysts is necessary to effectuate the copolymerization of sulfur dioxide with bicyclo[2.2.1]hept-2-ene and its derivatives.

It has been unexpectedly and surprisingly discovered by this invention, however, that when sulfur dioxide is copolymerized with bicyclo[2.2.1]hept-2-ene or its derivatives, an external source of free-radicals is unnecessary and, in fact, actually hinders the copolymerization. For example, when a mixture of bicyclo[2.2.1]hept-2-ene, sulfur dioxide and methanol is heated at 50° C., a rapid reaction occurs and, within 1 to 2 minutes a very high molecular weight copolymer, having a reduced viscosity of about 1.23, as determined at 30° C. from a solution of 0.2 gram of the copolymer in 100 milliliters of cyclohexanone, is produced at a conversion of 81 percent of theory, based on the bicyclo[2.2.1]hept-2-ene charged. On the other hand, when azo-bis-isobutyronitrile, a common free-radical initiator, is also charged to the reaction mixture, about 10 minutes are required to achieve a conversion of only 72 percent of the bicyclo[2.2.1]hept-2-ene to a lower molecular weight copolymer, having a reduced viscosity of 0.70.

An unusual characteristic of the autocatalytic copolymerization of this invention is that very high conversions, generally from about 50 to about 70 percent and often up to 100 percent, are readily obtained within 10 to 15 seconds at temperatures as low as 0° C. or below. With further reaction time, although polymer molecular weight increases, there is little or no increase in the degree of conversion of bicyclic monomer to polymer. In addition, it has been determined by electron paramagnetic resonance studies that free-radical concentrations of the order of $10^{-5}$ molar are attained in only a few minutes, whereas the usual steady state, free-radical concentration in other known free-radical polymerizations is of the order of only $10^{-8}$ molar.

These observations suggest that the polymerization occurs by the formation of a sulfur dioxide-bicycloheptene complex which then decomposes to form a bicycloheptylsulfonyl diradical. This diradical then unites with other diradicals to form a polymeric diradical, as illustrated by the following equations for the reaction of sulfur dioxide with bicyclo[2.2.1]hept-2-ene.

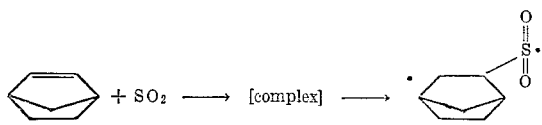

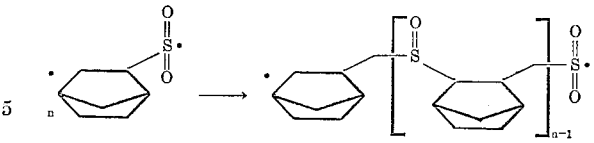

Thus, unless there is a contaminant which would terminate the chain growth, such as a monoradical from a peroxide or other free-radical catalyst, it is possible by the process of this invention to produce a "living" polymer whose maximum molecular weight is limited only by diffusion at high conversions.

Accordingly, the process of this invention essentially comprises the autocatalytic copolymerization of sulfur dioxide with a mono - olefinically - unsaturated compound containing the bicyclo[2.2.1]hept-2-ene nucleus to produce polymeric diradicals which can be reacted with vinyl monomers to produce various polymers or terminated to produce useful polymers.

The bicyclo[2.2.1]hept-2-enes which can be employed in the process of this invention can be generally represented by the formula:

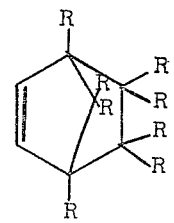

wherein each R, individually, is hydrogen, halogen, or an inert organic radical; i.e. any group of atoms, either organic or inorganic, that normally passes unchanged from one molecule of an organic compound to another (see "Hackh's Chemical Dictionary," Third Edition, McGraw-Hill Co., New York, page 714 (1944)) and which does not terminate the polymeric diradical chain. As examples of suitable organic radicals one can mention cyano, carboxyl, hydroxyl, and amido radicals as well as the corresponding ester, ether, and N-substituted or N,N-di-substituted amido radicals; aliphatic and cycloaliphatic radicals and substituted derivatives thereof; aromatic radicals and substituted dericatives thereof; and the like; and two R's on adjacent saturated carbon atoms, when taken together, can form a divalent alkylene or substituted alkylene group, a divalent dicarboxylic anhydride group, a divalent dicorboximide group or an N-substituted divalent dicarboximide group. In general, the bicyclo[2.2.1]hept-2-ene should have a molecular weight of less than about 600.

As examples of compounds of Formula I one can mention:

Bicyclo[2.2.1]hept-2-ene
5-chlorobicyclo[2.2.1]hept-2-ene
7-chlorobicyclo[2.2.1]hept-2-ene
7-bromobicyclo[2.2.1]hept-2-ene
5-methylbicyclo[2.2.1]hept-2-ene
5-ethylbicyclo[2.2.1]hept-2-ene
5-hexylbicyclo[2.2.1]hept-2-ene
5-phenylbicyclo[2.2.1]hept-2-ene
5-nitrobicyclo[2.2.1]hept-2-ene
5-(iodomethyl)bicyclo[2.2.1]hept-2-ene
5-(bromomethyl)bicyclo[2.2.1]hept-2-ene
5-(chloromethyl)bicyclo[2.2.1]hept-2-ene
5-(fluoromethyl)bicyclo[2.2.1]hept-2-ene
5-(pentafluoroethyl)bicyclo[2.2.1]hept-2-ene
5-benzoylbicyclo[2.2.1]hept-2-ene
5-butoxybicyclo[2.2.1]hept-2-ene 5-[(benzyloxy)methyl]bicyclo[2.2.1]hept-2-ene
5-[(4-biphenyloxy)methyl]bicyclo[2.2.1]hept-2-ene
5-[(4-tert.-butylphenoxy)methyl]bicyclo[2.2.1]hept-2-ene
5-[(o-chlorophenoxy)methyl]bicyclo[2.2.1]hept-2-ene
5-[(2-cyanoethoxy)methyl]bicyclo[2.2.1]hept-2-ene
5-(carboxymethyl)bicyclo[2.2.1]hept-2-ene
Bicyclo[2.2.1]hept-2-ene-5-yl acetonitrile
Bicyclo[2.2.1]hept-2-ene-5-yl carbonitrile
5,5-dimethylbicyclo[2.2.1]hept-2-ene
5,6-dimethylbicyclo[2.2.1]hept-2-ene
5,5-dichlorobicyclo[2.2.1]hept-2-ene
5,6-dichlorobicyclo[2.2.1]hept-2-ene
5,6-diacetylbicyclo[2.2.1]hept-2-ene
5-ethyl-6-p-tolylsulfonylbicyclo[2.2.1]hept-2-ene
5-methyl-5-(trifluoromethyl)bicyclo[2.2.1]hept-2-ene
5,6-di-p-toluylbicyclo[2.2.1]hept-2-ene
5,6-bis(p-chlorobenzoyl)bicyclo[2.2.1]hept-2-ene
5,6-bis(2,4,6-trimethylbenzoyl)bicyclo[2.2.1]hept-2-ene
1,7,7-trimethylbicyclo[2.2.1]hept-2-ene
5,5,6-trimethylbicyclo[2.2.1]hept-2-ene
5,5-dimethyl-6-methylenebicyclo[2.2.1]hept-2-ene
5,5-dimethylbicyclo[2.2.1]hept-2-ene-6-acetic acid
1,4,7-triphenylbicyclo[2.2.1]hept-2-ene
Bicyclo[2.2.1]hept-2-ene-5,6-dicarboxylic anhydride
Bicyclo[2.2.1]hept-2-ene-5,6-dicarboximide
N-butylbicyclo[2.2.1]hept-2-ene-5,6-dicarboximide
N-benzylbicyclo[2.2.1]hept-2-ene-5,6-dicarboximide
N-phenyl bicyclo[2.2.1]hept-2-ene-5,6-dicarboximide
1,4,7,7-tetramethylbicyclo[2.2.1]hept-2-ene
Bicyclo[2.2.1]hept-2-ene-7-ol
1,4-diphenylbicyclo[2.2.1]hept-2-ene-5,6-dicarboxylic anhydride A preferred class of substituted bicyclo[2.2.1]hept-2-enes are those having no substitution except on the 5- or 6-carbon atoms of the bicyclo[2.2.1]hept-2-ene nucleus. These compounds can be represented by the formula:

(II)
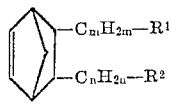

wherein each $m$ and $n$, when taken individually, is an integer having a value of from 0 to about 20; each $R^1$ and $R^2$, when taken individually is hydrogen, halogen, cyano, hydroxyl, alkoxy of from 1 to about 20 carbon atoms, carboxyl, alkoxy-carbonyl of from 1 to about 20 carbon atoms, alkanoyloxy of from 1 to about 20 carbon atoms, N,N-dialkylamino of from 1 to about 20 carbon atoms, amido, N-alkylamino of from 1 to about 20 carbon atoms, N,N-dialkylamido of from 1 to about 20 carbon atoms, aryl of from 6 to about 20 carbon atoms, alkaryl of from 7 to about 20 carbon atoms, cycloalkyl of from 5 to about 20 carbon atoms, or alkyl-substituted cycloalkyl of from 6 to 20 carbon atoms; and, when each $m$ and $n$ has a value of 0, $R^1$ and $R^2$, when taken together, form a divalent dicarboxylic acid anhydride group

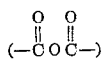

a divalent imide group

a divalent N-alkyl imide group having from 1 to about 20 carbon atoms in the alkyl group thereof, or a divalent hydrocarbon group of from 3 to 10 carbon atoms, such as trimethylene, 1,3-cyclopentylene and the like.

As examples of suitable bicycloheptenes of this class, one can mention

Bicyclo[2.2.1]hept-2-ene,
5-chlorobicyclo[2.2.1]hept-2-ene,
5-bromobicyclo[2.2.1]hept-2-ene,
5,6-dichlorobicyclo[2.2.1]hept-2-ene,
5-cyanobicyclo[2.2.1]hept-2-ene,
5-hydroxybicyclo[2.2.1]hept-2-ene,
5-methoxybicyclo[2.2.1]hept-2-ene,
5-ethoxybicyclo[2.2.1]hept-2-ene,
5-isopropoxybicyclo[2.2.1]hept-2-ene,
5-(2'-ethylhexoy)bicyclo[2.2.1]hept-2-ene,
5-eicosoxybicyclo[2.2.1]hept-2-ene,
5-carboxybicyclo[2.2.1]hept-2-ene,
5-methoxycarbonylbicyclo[2.2.1]hept-2-ene,
5-(2'-ethylhexoxycarbonyl)bicyclo[2.2.1]hept-2-ene,
5-eicosoxycarbonylbicyclo[2.2.1]hept-2-ene,
5-acetoxybicyclo[2.2.1]hept-2-ene,
5-(2'-ethylhexanoyl)bicyclo[2.2.1]hept-2-ene,
5-arachidylbicyclo[2.2.1]hept-2-ene,
5-(N,N-dimethylamino)bicyclo[2.2.1]hept-2-ene,
5-bicyclo[2.2.1]hept-2-ene carboxamide,
N-methyl 5-bicyclo[2.2.1]hept-2-ene carboxamide,
N,N-dimethyl 5-bicyclo[2.2.1]hept-2-ene carboxamide,
5-phenylbicyclo[2.2.1]hept-2-ene,
5-tolylbicyclo[2.2.1]hept-2-ene,
5-cyclopentylbicyclo[2.2.1]hept-2-ene,
5-(methylcyclopentyl)bicyclo[2.2.1]hept-2-ene,
5-methylbicyclo[2.2.1]hept-2-ene,
5-ethylbicyclo[2.2.1]hept-2-ene,
5-hexylbicyclo[2.2.1]hept-2-ene,
5-eicosylbicyclo[2.2.1]hept-2-ene,
5-chloromethylbicyclo[2.2.1]hept-2-ene,
5-cyanomethylbicyclo[2.2.1]hept-2-ene,
5-hydroxymethylbicyclo[2.2.1]hept-2-ene,
5-methoxymethylbicyclo[2.2.1]hept-2-ene,
5-carboxymethylbicyclo[2.2.1]hept-2-ene,
5-methoxycarbonylmethylbicyclo[2.2.1]hept-2-ene,
5-acetoxymethylbicyclo[2.2.1]hept-2-ene,
5-(N,N-dimethylaminomethyl)bicyclo[2.2.1]hept-2-ene,
5-bicyclo[2.2.1]hept-2-ene acetamide,
N-methyl-5-bicyclo[2.2.1]hept-2-ene acetamide,
N,N-dimethyl-5-bicyclo[2.2.1]hept-2-ene acetamide,
5-benzylbicyclo[2.2.1]hept-2-ene,
5-(p-methylbenzyl)bicyclo[2.2.1]hept-2-ene,
5-(cyclopentylmethyl)bicyclo[2.2.1]hept-2-ene,
5,6-bicyclo[2.2.1]hept-2-ene dicarboxylic anhydride,
5,6-bicyclo[2.2.1]hept-2-ene dicarboximide,
N,-methyl-5,6-bicyclo[2.2.1]hept-2-ene dicarboximide, and the like.

The autocatalytic copolymerization of this invention can be conducted by charging sulfur dioxide and the selected bicyclo[2.2.1] hept-2-ene to a reaction vessel in a molar ratio of from about 0.05 to about 20 moles of sulfur dioxide per mole of bicyclo[2.2.1]hept-2-ene. However, because the resulting copolymer contains the sulfur dioxide and bicyclo[2.2.1]hept-2-ene in approximately an equimolar ratio, an excess of either monomer is not necessary and the excess charged has a solvent effect only.

The reaction can be conducted in the presence of an inert liquid reaction medium, which can be a solvent for either or both monomers or for the resulting copolymer, if desired. Suitable for use as the inert reaction medium are cyclohexanone, benzene, chlorobenzene, water, acetone, acetonitrile, alcohols such as methanol, ethanol, isopropanol and the like, aliphatic hydrocarbons, such as heptane, octane, nonane, and the like, etc.

The temperature of the reaction is not narrowly critical, and temperatures of from about $-40°$ C. or lower to about $100°$ C. or higher are suitable. However, it is preferred to conduct the polymerization at a temperature of from about $-10°$ C. to about $60°$ C.

The reaction pressure is not critical and sub-atmospheric, atmospheric and super-atmospheric pressures can be employed if desired, although pressures of about atmospheric pressure are preferred.

Because the polymer produced by the autocatalytic process of this invention is a "living" copolymer; i.e., capable of initiating free-radical polymerizations, it is capable of initiating copolymerizations with other olefinically-unsaturated monomers capable of polymerization by free radical techniques. For example, sulfur dioxide, a selected bicyclo[2.2.1]hept-2-ene compound and at least one other polymerizable monomer can be charged to a reaction vessel to produce a homogenous terpolymer, or sulfur dioxide and a bicyclo[2.2.1]hept-2-ene can be copolymerized and a third polymerizable monomer added to the polymerizing mixture whereby a block terpolymer is produced.

The termonomers which can be employed on the production of terpolymers in accordance with this invention are olefinically-unsaturated compounds containing the >C=C< group, at least one carbon atom of which is bonded to a substituent having a positive Hammett para-sigma value, that is a Hammett para-sigma value of greater than 0. Preferred are those compounds having a molecular weight of less than about 250.

The Hammett para-sigma value is determined by the equation $$\sigma = \log K - \log K°$$

wherein $K°$ is the ionization constant for benzoic acid in water at 25° C. and K is the ionization constant for a para-substituted benzoic acid. (See G. E. K. Branch et al, "The Theory of Organic Chemistry," Prentice Hall, New York (1941) at page 414.) The Hammett para-sigma values for several suitable substituents are tabulated below.

| Substituent: | p-$\sigma$ |
|---|---|
| $C_6H_5-$ | +0.009 |
| F— | +0.062 |
| Cl— | +0.227 |
| Br— | +0.232 |
| $CH_3COO-$ | +0.31 |
| 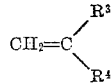 | +0.45 |
| N≡C— | +1.00 |

Alkyl or alkoxy substituents have negative Hammett para-sigma values and monomers containing these substituents only are not suitable for use in the production of ter-polymers in accordance with this invention.

As examples of suitable termonomers one can mention vinyl and vinylidene halides such as vinyl chloride, vinyl fluoride, vinylidene chloride and the like; vinyl esters such as vinyl formate, vinyl acetate, vinyl propionate, vinyl butyrate, vinyl chloroacetate, vinyl chloropropionate and the like; acrylic and alpha-alkyl acrylic acids, their amides and their nitriles such as acrylic acid, chloroacrylic acid, methacrylic acid, ethacrylic acid, methyl acrylate, ethyl acrylate, n-decy acrylate, methyl methacrylate, butyl methacrylate, acrylamide, N-methyl acrylamide, N,N-dimethyl acrylamide, methacrylamide, acrylonitrile, methacrylonitrile, chloroacrylonitrile and the like; maleic and fumaric acids, their esters and anhydrides such as dimethyl maleate, diethyl maleate, monobutylmaleate, and the like; et cetera.

A preferred class of termonomers can be represented by the formula:

$$CH_2=C\diagup^{R^3}_{\diagdown R^4}$$

wherein $R^3$ is either hydrogen, methyl or chlorine, and $R^4$ is phenyl, chlorine, acetoxy, cyano or alkoxycarbonyl wherein the alkoxy group contains from 1 to about 12 carbon atoms.

The terpolymers of this invention can contain from about 5 mole percent or less to about 95 mole percent or more of polymerized termonomer. The balance of the terpolymer will be polymerized sulfur dioxide and polymerized bicyclo[2.2.1]hept-2-ene compound, which will be present in an approximately equimolar ratio. Although the ratio of sulfur dioxide to bicyclo[2.2.1]hept-2-ene compound in a copolymer is generally equimolar, it has been found that the presence of a third vinyl-type monomer slightly affects this ratio in the terpolymer. However, if X is the mol percent of the termonomer in the terpolymer and, thus, the mole percent of sulfur dioxide and bicyclo[2.2.1]hept-2-ene compound will be (100—X), the molar percent of either sulfur dioxide or the bicyclo[2.2.1]hept-2-ene compound will normally be within the range $$\frac{100-X}{2} \pm 5$$

mole percent and preferably in the range $$\frac{100-X}{2} \pm 0.1\left(\frac{100-X}{2}\right)$$

mole percent.

The terpolymers of this invention can have a wide variety of properties, depending upon the amount of and the particular bicyclo[2.2.1]hept-2-ene and the third polymerizable monomer employed. In general, the softening points of these terpolymers increase with increasing sulfur dioxide/bicyclo[2.2.1]hept-2-ene compound content. The polymers can be employed as films, coatings, fibers, for the production of molds for the casting of other materials such as epoxide resins and the like.

The polymerization process of this invention has wide utility as a simple method for casting films, coatings and the like. For example, a bicyclo[2.2.1]hept-2-ene compound and sulfur dioxide vapors can be contacted on a substrate to effectuate encapsulation or the formation of a film. Cast articles can be readily produced by rotational molding techniques by the use of a solution of bicyclo[2.2.1]hept-2-ene and, if desired, another polymerizable monomer which, when sulfur dioxide is introduced, will polymerize to form an article conforming to the configuration of the mold.

A specific group of copolymers of this invention finds utility in molds for potting electrical components. These are copolymers of sulfur dioxide and a 5-alkanoyloxymethylbicyclo[2.2.1]hept-2-ene wherein the alkanoyl group contains from about 12 to about 20 carbon atoms, preferably 5 - stearoyloxymethylbicyclo[2.2.1]hept-2-ene. In the past, it has been the practice to employ highly-plasticized cellulose acetate-butyrate copolymers as molds for potting electrical components with epoxide resins. This system has several drawbacks, including high cost, and it becomes discolored during use, limiting its use to one application. The sulfur dioxide/5-alkanoyloxybicyclo[2.2.1]hept-2-ene copolymers, however, readily form a transparent mold which is weak enough at room temperature to permit electrical components to be forced into it for positioning and yet is strong enough to maintain its shape at the elevated temperatures necessary to cure the epoxide resin. In addition the mold is unaffected by the curing of the epoxide system and is reusable.

As employed herein the term "reduced viscosity" is the ratio of the difference in the specific viscosities of a solution of the polymer in solution and the specific viscosity of the solvent at a given temperature to the viscosity of the solvent divided by the concentration of the polymer in the solution. The reduced viscosity is determined by the equation.

$$N_r = \frac{N-N_0}{N_0/C}$$

wherein $N_r$ is the reduced viscosity, $N_0$ is the viscosity of the solvent, N is the viscosity of the solution and C is the concentration of the polymer in the solution in grams per 100 ml.

*Example 1*

A 50-milliliter, crown-capped polymerization tube was cooled to —80° C. and charged with 5.0 grams of bicyclo[2.2.1]hept-2-ene, 10.0 grams of methanol and 5.0 grams of sulfur dioxide. The tube was then sealed and rotated end-over-end in a water-ethylene glycol bath which was maintained at 0° C. After 10 minutes, during which time the contents of the tube had become solid, the tube was opened and the contents were washed twice with 50-milliliter portions of methanol. After vacuum drying overnight at room temperature, there were obtained 6.08 grams of a bicyclo[2.2.1]hept-2-ene/sulfur dioxide copolymer containing 50 mole percent bicyclo[2.2.1]hept-2-ene and 50 mole percent sulfur dioxide. The copolymer was soluble in cyclohexanone and had a reduced viscosity of 1.24, as determined at 30° C. from a solution of 0.2 gram of the copolymer in 100 milliliters of cyclohexanone.

*Example 2*

Employing identical apparatus, procedures, reactants and charge proportions, except that the reaction was conducted for 2 minutes at 50° C., there were recovered 6.82 grams of a 50/50 bicyclo[2.2.1]hept-2-ene/sulfur dioxide copolymer having a reduced viscosity of 1.22 in cyclohexanone.

*Example 3*

Employing apparatus and procedures similar to those described in Example 1, except that the methanol was omitted, there were recovered 4.88 grams of a 50/50 bicyclo[2.2.1]hept-2-ene/sulfur dioxide copolymer having a reduced viscosity of 1.82 in cyclohexanone.

*Example 4*

Employing apparatus and procedures similar to those described in Example 1, 3.0 grams of bicyclo[2.2.1]-hept-2-ene, 2.0 grams of sulfur dioxide in 17.0 grams of cyclohexanone were heated at 0° C. for 3 minutes. The contents of the tube, a viscous solution of a 50/50 bicyclo [2.2.1]hept-2-ene/sulfur dioxide copolymer in the cyclohexanone, were admixed with methanol, whereby the copolymer precipitated. After filtering from the methanol, washing three times with methanol and vacum drying, the copolymer weighed 3.78 grams and had a reduced viscosity of 0.89 in cyclohexanone.

*Example 5*

Employing apparatus and procedures similar to those described in Example 1, except that 5.0 grams of 5-n-hexylbicyclo[2.2.1]hept-2-ene were substituted for the bicyclo[2.2.1]hept-2-ene, 10.0 grams of benzene were substituted for the methanol and the reaction was conducted at 40° C. for 20 minutes, there were recovered 1.75 grams of a 50/50 5-n-hexylbicyclo[2.2.1]hept-2-ene/sulfur dioxide copolymer having a reduced viscosity of 1.12 in cyclohexanone.

*Example 6*

Employing apparatus and procedures similar to those described in Example 1, except that 5.0 grams of 5-chloromethylbicyclo[2.2.1]hept-2-ene were substituted for the bicyclo[2.2.1]hept-2-ene, and the reaction was conducted at 50° C. for 25 minutes, there were recovered 2.34 grams of a 50/50 5-chloromethylbicyclo[2.2.1]hept-2-ene/sulfur dioxide copolymer having a reduced viscosity of 0.85 in cyclohexanone.

*Example 7*

Employing apparatus and procedures similar to those described in Example 1, a charge of 37.5 grams of 5-hydroxymethylbicyclo[2.2.1]hept-2-ene, 19.2 grams of sulfur dioxide and 56.7 grams of cyclohexanone was heated at 25° C. for 4 hours to produce 9.6 grams of a 50/50 5 - hydroxymethylbicyclo[2.2.1]hept-2-ene/sulfur dioxide copolymer.

*Example 8*

Employing apparatus and procedures similar to those described in Example 1, a charge of 5.0 grams of 5-acetoxybicyclo[2.2.1]hept-2-ene, 5.0 grams of sulfur dioxide and 10.0 grams of methanol was heated at 50° C. for 25 minutes to produce 1.29 grams of a 50/50 5-acetoxybicyclo[2.2.1]hept-2-ene/sulfur dioxide copolymer having a reduced viscosity of 0.56 in cyclohexanone.

*Example 9*

Employing apparatus and procedures similar to those described in Example 1, a charge of 11.1 grams of 5-myristoyloxymethylbicyclo[2.2.1]hept-2-ene, 2.1 grams of sulfur dioxide and 17 grams of cyclohexanone was heated at 50° C. for 4.5 hours to produce 5.5 grams of a 50/50 5 - myristoyloxymethylbicyclo[2.2.1]hept-2-ene/sulfur dioxide copolymer having a reduced viscosity of 0.67 in benzene.

*Example 10*

Employing apparatus and procedures similar to those described in Example 1, a charge of 14.5 grams of 5-stearoyloxymethylbicyclo[2.2.1]hept-2-ene and 3.0 grams of sulfur dioxide was held at 25° C. for 1 hour to produce 5.2 grams of a 50/50 5-stearoyloxymethylbicyclo[2.2.1]-hept-2-ene/sulfur dioxide copolymer having a reduced viscosity of 0.71 in benzene.

*Example 11*

Employing apparatus and procedures similar to those described in Example 1, a charge of 13.8 grams of bicyclo[2.2.1]hept-2-ene-5-carboxylic acid and 6.4 grams of sulfur dioxide was heated at 50° C. for 1.5 hours to produce 14.0 grams of 50/50 bicyclo[2.2.1]hept-2-ene-5-carboxylic acid/sulfur dioxide copolymer which was soluble in dilute aqueous sodium hydroxide and had a reduced viscosity of 4.41 in dimethylformamide.

*Example 12*

Employing apparatus and procedures similar to those described in Example 1, a charge of 8.2 grams of bicyclo[2.2.1]hept-2-ene-5,6-dicarboxylic anhydride, 3.2 grams of sulfur dioxide and 15 grams of acetonitrile was heated at 50° C. for 8 hours to produce 4.65 grams of a 50/50 bicyclo[2.2.1]hept-2-ene-5,6-dicarboxylic anhyride/sulfur dioxide copolymer which was soluble in dilute aqueous sodium hydroxide and had a reduced viscosity of 5.92 in dimethylformamide.

*Example 13*

A 4-necked, 500-milliliter, round-bottomed flask, equipped with a thermometer, a Dry Ice condenser and a stirrer was cooled to −8° C. and a solution of 2.9 grams of bicyclo[2.2.1]hept-2-ene in 150 milliliters of cyclohexanone was added to the flask. The flask was warmed to room temperature and 1.6 grams of sulfur dioxide at a temperature of −80° C. were added. After 90 seconds 75 grams of ethyl acrylate were added and, after 10 minutes, the reaction mixture became slightly cloudy. After a total reaction time of 24 hours at room temperature the reaction mixture was admixed with methanol to precipitate the bicyclo[2.2.1]hept-2-ene/sulfur dioxide/ ethyl acrylate terpolymer which had formed. After filtering from the methanol, washing with methanol and vacuum drying, the polymer weighed 4.72 grams and had a reduced viscosity of 0.45 in cyclohexanone. The polymer contained 42.3 mole percent bicyclo[2.2.1]hept-2-ene, 39.9 mole percent sulfur dioxide and 17.8 mole percent ethyl acrylate.

*Example 14*

A 500-milliliter, round-bottomed flask, equipped with a thermometer, a stirrer and a nitrogen purge was charged with a solution of 15.0 grams of bicyclo[2.2.1]hept-2-ene in 225 milliliters of cyclohexanone and cooled to 0° C. Then 15.0 grams of sulfur dioxide at −80° C. were added to the flask, and the temperature immediately rose to 25° C. After 5 minutes a 50-milliliter portion of the reaction mixture was admixed with methanol to precipitate a 50/50 bicyclo[2.2.1]hept-2-ene/sulfur dioxide polymer which weighed 4.42 grams and had a reduced viscosity of 0.42 in cyclohexanone.

A 25-milliliter portion of the polymerizing mixture was also added to a second flask containing 100 grams of ethyl acrylate and 100 milliliters of cyclohexanone at a temperature of 55° C. The reaction temperature rose to 66° C. and the mixture became viscous. After 20 minutes the contents of the second flask were admixed with methanol to precipitate the bicyclo[2.2.1]hept-2-ene/sulfur dioxide/ethyl acrylate polymer which had formed. After filtering from the methanol, washing with 500 milliliters of methanol and vacuum drying, the polymer weighed 26.6 grams and had a reduced viscosity of 0.70 in cyclohexanone. The polymer contained 4.46 mole percent polymerized bicyclo[2.2.1]hept-2-ene, 5.43 mole percent polymerized sulfur dioxide and 90.11 mole percent polymerized ethyl acrylate.

*Example 15*

Employing apparatus and procedures similar to those described in Example 14, except that 100 grams of styrene were substituted for the ethyl acrylate, the portion of the bicyclo[2.2.1]hept-2-ene/sulfur dioxide was taken after only 1 minute of copolymerization, and the polymerization with the styrene was carried out for 90 minutes, there were recovered 2.8 grams of a bicyclo[2.2.1]hept-2-ene/sulfur dioxide/styrene polymer having a reduced viscosity of 0.81 in cyclohexanone. The polymer contained 35.0 mole percent polymerized bicyclo[2.2.1]hept-2-ene, 34.9 mole percent polymerized sulfur dioxide and 30.1 mole percent polymerized styrene.

*Example 16*

Employing apparatus and procedures similar to those described in Example 14, except that 100 grams of vinyl acetate were substituted for the styrene, and the polymerization with the vinyl acetate was conducted for 240 minutes, there was recovered 0.58 gram of a bicyclo[2.2.1]hept-2-ene/sulfur dioxide/vinyl acetate polymer having a reduced viscosity of 0.14 in cyclohexanone. The polymer contained 29.8 mole percent polymerized bicyclo[2.2.1]hept-2-ene, 19.0 mole percent polymerized sulfur dioxide and 51.2 mole percent polymerized vinyl acetate.

*Example 17*

Employing apparatus and procedures similar to those described in Example 14, except that a portion of polymerizing bicyclo[2.2.1]hept-2-ene and sulfur dioxide was taken after only 10 seconds and added to 100 milliliters of vinyl chloride and the subsequent polymerization was conducted at −10° C. for 60 minutes, there was recovered 0.38 gram of a bicyclo[2.2.1]hept-2-ene/sulfur dioxide/vinyl chloride polymer having a reduced viscosity of 0.79 in cyclohexanone. The polymer contained 43.7 mole percent polymerized bicyclo[2.2.1]hept-2-ene, 39.9 mole percent polymerized sulfur dioxide and 16.4 mole percent polymerized vinyl chloride.

*Example 18*

A 300-milliliter, crown-capped polymerization bottle was charged at −80° C. with 12.0 grams of bicyclo[2.2.1]hept-2-ene, 15.0 grams of sulfur dioxide, 3.0 grams of ethyl acrylate and 30 grams of methanol. The bottle was then sealed and rotated end-over-end in a glycol-water bath maintained at 0° C. The contents became slightly hazy after 5 minutes, milky white after 10 minutes, and solid after 20 minutes. The bottle was opened and the contents were admixed with methanol. After filtration from the methanol, washing twice with 500-milliliter portions of methanol and vacuum drying overnight at 50° C. there were obtained 20.0 grams of a bicyclo[2.2.1]hept-2-ene/sulfur dioxide/ethyl acrylate terpolymer having a reduced viscosity of 0.68 in cyclohexanone. The terpolymer contained 42.4 mole percent polymerized bicyclo[2.2.1]hept-2-ene, 45.0 mole percent polymerized sulfur dioxide and 12.6 mole percent polymerized ethyl acrylate.

*Examples 19–24*

Employing apparatus and procedures similar to those described in Example 18, except that benzene was employed as the reaction medium and the reaction was conducted at 25° C., six bicyclo[2.2.1]-hept-2-ene/sulfur dioxide/ethyl acrylate terpolymers were produced. The weights of the reactants charged, the reaction conditions and the results are set forth in Table I below:

TABLE I

| | Example | | | | | |
|---|---|---|---|---|---|---|
| | 19 | 20 | 21 | 22 | 23 | 24 |
| Charge, grams: | | | | | | |
| Bicyclo[2.2.1]-hept-2-ene | 18.8 | 18.8 | 18.8 | 18.8 | 9.4 | 4.7 |
| Sulfur dioxide | 12.8 | 12.8 | 12.8 | 12.8 | 6.4 | 3.2 |
| Ethyl acrylate | 10 | 20 | 40 | 100 | 100 | 100 |
| Benzene | 100 | 100 | 100 | 100 | 100 | 100 |
| Reaction Conditions: | | | | | | |
| Time, minutes | 60 | 60 | 60 | 60 | 60 | 60 |
| Temperature, °C | 25 | 25 | 25 | 25 | 25 | 25 |
| Results: | | | | | | |
| Yield, grams | 33.9 | 41.0 | 45.1 | 77.1 | | |
| Reduced viscosity [1] | 0.51 | 0.752 | 0.883 | 3.03 | 1.84 | 3.48 |
| Mole Percent Bicyclo-[2.2.1]hept-2-ene | 41.9 | 33.9 | 29.0 | 15.6 | 9.8 | 7.6 |
| Mole percent sulfur dioxide | 43.7 | 36.2 | 32.0 | 17.3 | 9.8 | 7.6 |
| Mole percent ethyl acrylate | 14.3 | 29.9 | 39.0 | 67.2 | 80.4 | 84.8 |

[1] Reduced viscosity in dimethylformamide.

*Example 25*

Employing apparatus and procedures similar to those described in Example 18, 28.2 grams of bicyclo[2.2.1]-hept-2-ene, 450 grams of butyl acrylate, 19.8 grams of sulfur dioxide and 300 grams of toluene were held at room temperature for 6 hours. The reaction mixture was poured into heptane to precipitate the bicyclo[2.2.1]hept-2-ene/sulfur dioxide/butyl acrylate terpolymer thus produced. After filtering from the heptane, washing with heptane and vacuum drying overnight at 45–50° C., there were recovered 70 grams of the terpolymer which had a reduced viscosity of 5.05 in benzene. The terpolymer contained 5.71 mole percent polymerized bicyclo[2.2.1]-hept-2-ene, 5.71 mole percent polymerized sulfur dioxide and 88.7 mole percent polymerized butyl acrylate.

*Example 26*

Employing apparatus and procedures similar to those described in Example 25, 18.8 grams of bicyclo[2.2.1]-hept-2-ene, 12.8 grams of sulfur dioxide and 20.8 grams of acrylonitrile were held at room temperature for 30 minutes to produce 16.6 grams of a terpolymer containing 39.2 mole percent polymerized bicyclo[2.2.1]hept-2-ene, 30.6 mole percent polymerized sulfur dioxide and 30.2 mole percent polymerized acrylonitrile. The terpolymer was insoluble in dimethylformamide, benzene, toluene, heptane, hexane, cyclohexane, ethanol, methanol, acetonitrile, chlorobenzene, ethylbenzene and dimethylsulfoxide.

*Example 27*

Employing apparatus and procedures similar to those described in Example 25, 9.4 grams of bicyclo[2.2.1]-hept-2-ene, 6.4 grams of sulfur dioxide and 23.6 grams of methyl methacrylate were held at room temperature for 12 hours to produce 2.2 grams of a terpolymer containing 5.98 mole percent polymerized bicyclo[2.2.1]hept-2-ene, 7.25 mole percent polymerized sulfur dioxide and 86.60 mole percent polymerized methyl methacrylate. The terpolymer had a reduced viscosity of 2.42 in dimethyl formamide.

*Example 28*

Employing apparatus and procedures similar to those described in Example 25, 4.7 grams of bicyclo[2.2.1]-hept-2-ene, 3.2 grams of sulfur dioxide and 31.6 grams of vinylidene chloride were held at room temperature for 2 hours to produce 1.0 gram of a terpolymer containing 36.1 mole percent polymerized bicyclo[2.2.1]hept-2-ene, 34.5 mole percent polymerized sulfur dioxide and 29.9 mole percent polymerized vinylidene chloride.

*Example 29*

Employing apparatus and procedures similar to those described in Example 25, 11.1 grams of 5-myristoyloxymethylbicyclo[2.2.1]hept-2-ene, 2.1 grams of sulfur dioxide, 1.3 gram of octyl acrylate and 15 grams of cyclohexanone were heated at 50° C. for 3.5 hours to produce 6.7 grams of a terpolymer of 5-myristoyloxymethylbicyclo[2.2.1]hept-2-ene, sulfur dioxide and octyl acrylate. The terpolymer had a reduced viscosity of 0.44 in benzene.

*Example 30*

Employing apparatus and procedures similar to those described in Example 25, 11.1 grams of 5-myristoyloxymethylbicyclo[2.2.1]hept-2-ene, 2.1 grams of sulfur dioxide and 2.6 grams of decyl acrylate were heated at 50° C. for 3.5 hours to produce 3.1 grams of a terpolymer of 5-myristoyloxymethylbicyclo[2.2.1]hept-2-ene, sulfur dioxide and decyl acrylate. The terpolymer had a reduced viscosity of 0.38 in benzene.

What is claimed is:

1. The polymerization process for producing a polysulfone resin, said process being induced by a non-external source of free radicals, which comprises contacting sulfur dioxide with a mono-olefinically unsaturated compound containing the bicyclo[2.2.1]hept-2-ene nucleus and having no substituents on the carbon atom forming the double bond of said nucleus, there being no source of free radicals other than those formed by said sulfur dioxide and said compound, said sulfur dioxide and said compound being contacted at a temperature of from −40° C. to 100° C. for a period of time sufficient to produce a polysulfone resin.

2. The process of claim 1 wherein said mono-olefinically unsaturated compound has no substituents except on the 5- and 6-carbon atoms.

3. The polymerization process for producing a polysulfone resin, said process being induced by a non-external source of free radicals, which comprises contacting sulfur dioxide with a bicyclo[2.2.1]hept-2-ene of the formula:

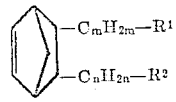

wherein each $m$ and $n$, when taken individually, is an integer having a value of from 0 to 20; each $R^1$ and $R^2$, when taken individually, is a member selected from the group consisting of hydrogen, halogen, cyano, hydroxyl, alkoxy of from 1 to 20 carbons, carboxyl, alkoxycarbonyl of from 1 to 20 carbons, alkanoyloxy of from 1 to 20 carbons, N,N-dialkylamino of from 1 to 20 carbons, amido, N-alkylamido of from 1 to 20 carbons, N,N-dialkylamido of from 1 to 20 carbons, amido, N-alkylamido of from 1 to 20 carbons, N,N-dialkylamido of from 1 to 20 carbons, aryl of from 6 to 20 carbons, alkaryl of from 7 to 20 carbons, cycloalkyl of from 5 to 20 carbons, and alkyl-substituted cycloalkyl of from 6 to 20 carbons; and, when both $m$ and $n$ are 0, $R^1$ and $R^2$, when taken together form a divalent group selected from the group consisting of dicarboxylic acid anhydride, dicarboximide, and N-alkyldicarboximide having from 1 to 20 carbons in the alkyl group thereof, there being no source of free radicals other than those formed by said sulfur dioxide and said compound, said sulfur dioxide and said compound being contacted, at a temperature from −40° C. to 100° C. for a period of time sufficient to produce said polysulfone resin.

4. The polymerization process for producing a polysulfone resin, said process being induced by a non-external source of free radicals, which comprises contacting sulfur dioxide with bicyclo[2.2.1]hept-2-ene, there being no source of free radicals other than those formed by said sulfur dioxide and said bicyclo[2.2.1]hept-2-ene, said sulfur dioxide and said bicyclo[2.2.1]hept-2-ene being contacted at a temperature of from −40° C. to 100° C. for a period of time sufficient to produce said polysulfone resin.

5. The polymerization process for producing a polysulfone resin, said process being induced by a nonexternal source of free radicals, which comprises contactinng sulfur dioxide with 5-alkylbicyclo[2.2.1]hept-2-ene containing from 1 to 20 carbon atoms in the alkyl group thereof, there being no source of free radicals other than those formed by said sulfur dioxide and said 5-alkylbicyclo[2.2.1]hept-2-ene, said sulfur dioxide and said 5-alkylbicyclo[2.2.1]hept-2-ene being contacted at a temperature of from −40° C. to 100° C. for a period of time sufficient to produce said polysulfone resin.

6. The polymerization process for producing a polysulfone resin, said process being induced by a nonexternal source of free radicals, which comprises contacting sulfur dioxide with 5-hexylbicyclo[2.2.1]hept-2-ene, there being no source of free radicals other than those formed by said sulfur dioxide and said 5-hexylbicyclo[2.2.1]hept-2-ene, said sulfur dioxide and said 5-hexylbicyclo[2.2.1]hept-2-ene being contacted at a temperature of from −40° C. to 100° C. for a period of time sufficient to produce said polysulfone resin.

7. The polymerization process for producing a polysulfone resin, said process being induced by a nonexternal source of free radicals, which comprises contacting sulfur dioxide with a 5-haloalkylbicyclo[2.2.1]hept-2-ene having from 1 to 20 carbons in the alkyl group thereof, there being no source of free radicals other than those formed by said sulfur dioxide and said 5-haloalkylbicyclo[2.2.1]hept-2-ene, said sulfur dioxide and said 5-haloalkylbicyclo[2.2.1]hept-2-ene being contacted at a temperature of from −40° C. to 100° C. for a period of time sufficient to produce said polysulfone resin.

8. The polymerization process for producing a polysulfone resin, said process being induced by a nonexternal source of free radicals, which comprises contacting sulfur dioxide with 5-chloromethylbicyclo[2.2.1]hept-2-ene, there being no source of free radicals other than those formed by said sulfur dioxide and said 5-chloromethylbicyclo[2.2.1]hept-2-ene, said sulfur dioxide and said 5-chloromethylbicyclo[2.2.1]hept-2-ene being contacted at a temperature of from −40° C. to 100° C. for a period of time sufficient to produce said polysulfone resin.

9. The polymerization process for producing a polysulfone resin, said process being induced by a nonexternal source of free radicals, which comprises contacting sulfur dioxide with 5-hydroxyalkylbicyclo[2.2.1]

hept-2-ene having from 1 to 20 carbons in the alkyl group thereof, there being no source of free radicals other than those formed by said sulfur dioxide and said 5-hydroxyalkyl-bicyclo[2.2.1]hept-2-ene, said sulfur dioxide and said 5-hydroxyalkylbicyclo[2.2.1]hept-2-ene being contacted at a temperature of from −40° C. to 100° C. for a period of time sufficient to produce said polysulfone resin.

10. The polymerization process for the production of a polysulfone resin, said process being induced by a non-external source of free radicals, which comprises contacting sulfur dioxide with 5-hydroxymethylbicyclo[2.2.1]hept-2-ene, there being no source of free radicals other than those formed by said sulfur dioxide and said 5-hydroxymethylbicyclo[2.2.1]hept-2-ene, said sulfur dioxide and said 5-hydroxymethylbicyclo[2.2.1]hept-2-ene being contacted at a temperature of from −40° C. to 100° C. for a period of time sufficient to produce said polysulfone resin.

11. The polymerization process for the production of a polysulfone resin, said process being induced by a non-external source of free radicals, which comprises contacting sulfur dioxide with 5-alkanoyloxymethylbicyclo[2.2.1]hepe-2-ene having from 1 to 20 carbon atoms in the alkanoyl group thereof, there being no external source of free radicals other than those formed by said sulfur dioxide and said 5-alkanoylmethylbicyclo[2.2.1]hept-2-ene, said sulfur dioxide and said 5-alkanoylmethylbicyclo[2.2.1]hept-2-ene being contacted at a temperature of from −40° C. to 100° C. for a period of time sufficient to produce said polysulfone resin.

12. The polymerization process for producing a polysulfone resin, said process being induced by a nonexternal source of free radicals, which comprises contacting sulfur dioxide with 5-acetoxybicyclo[2.2.1]hept-2-ene, there being no source of free radicals other than those formed by said sulfur dioxide and said 5-acetoxymethylbicyclo[2.2.1]hept-2-ene, said sulfur dioxide and said 5-acetoxymethylbicyclo[2.2.1]hept-2-ene being contacted at a temperature of from −40° C. to 100° C. for a period of time sufficient to produce said polysulfone resin.

13. The polymerization process for producing a polysulfone resin, said process being induced by a nonexternal source of free radicals, which comprises contacting sulfur dioxide with 5-myristoyloxymethylbicyclo[2.2.1]hept-2-ene, there being no other source of free radicals other than those formed by said sulfur dioxide and said 5-myristoloxymethylbicyclo[2.2.1]hept-2-ene, said sulfur dioxide and said 5-myristoyloxymethylbicyclo[2.2.1]hept-2-ene being contacted at a temperature of from −40° C. to 100° C. for a period of time sufficient to produce said polysulfone resin.

14. The polymerization process for producing a polysulfone resin, said process being induced by a nonexternal source of free radicals, which comprises contacting sulfur dioxide with 5-stearoyloxymethylbicyclo[2.2.1]hept-2-ene, there being no other source of free radicals other than those formed by said sulfur dioxide and said 5-stearoyloxymethylbicyclo[2.2.1]hept-2-ene, said sulfur dioxide and said 5-stearoyloxymethylbicyclo[2.2.1]hept-2-ene being contacted at a temperature of from −40° C. to 100° C. for a period of time sufficient to produce said polysulfone resin.

15. The polymerization process for producing a polysulfone resin, said process being induced by a nonexternal source of free radicals, which comprises contacting sulfur dioxide with 5-bicyclo[2.2.1]hept-2-ene carboxylic acid, there being no other source of free radicals other than those formed by said sulfur dioxide and said 5-bicyclo[2.2.1]hept-2-ene carboxylic acid, said sulfur dioxide and said 5-bicyclo[2.2.1]hept-2-ene carboxylic acid being contacted at a temperature of from −40° C. to 100° C. for a period of time sufficient to produce said polysulfone resin.

16. The polymerization process for producing a polysulfone resin, said process being induced by a nonexternal source of free radicals, which comprises contacting sulfur dioxide with 5,6-bicyclo[2.2.1]hept-2-ene dicarboxylic acid anhydride, there being no other source of free radicals other than those formed by said sulfur dioxide and said 5,6-bicyclo[2.2.1]hept-2-ene dicarboxylic acid anhydride, said sulfur dioxide and said 5,6-bicyclo[2.2.1]hept-2-ene dicarboxylic acid anhydride being contacted at a temperature of from −40° C. to 100° C. for a period of time sufficient to produce said polysulfone resin.

17. The polymerization process for producing a polysulfone resin, said process, being induced by a nonexternal source of free radicals, which comprises contacting (a) sulfur dioxide, (b) a mono-olefinically unsaturated compound containing the bicyclo[2.2.1]hept-2-ene nucleus having no substituents on the carbon atoms forming the double bond of said nucleus and (c) a mono-olefinically unsaturated monomer consisting of a $>C=C<$ group having at least one carbon atom bonded to a substituent having a positive Hammett para-signal value, there being no source of free radicals other than those formed by said sulfur dioxide and said compound.

18. The polymerization process for producing a polysulfone resin, said process being induced by a nonexternal source of free radicals, which comprises contacting (a) sulfur dioxide, (b) a bicyclo[2.2.1]hept-2-ene of the formula:

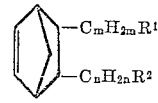

wherein each $m$ and $n$, when taken individually, is an integer having a value of from 0 to 20; each $R^1$ and $R^2$, when taken individually, is a member selected from the group consisting of hydrogen, halogen, cyano, hydroxyl, alkoxy of from 1 to 20 carbons, carboxyl, alkoxycarbonyl of from 1 to 20 carbons, alkanoyloxy of from 1 to 20 carbons, N,N-dialkylamino of from 1 to 20 carbons, amido, N-alkylamido of from 1 to 20 carbons, N,N-dialkylamido of from 1 to 20 carbons, aryl of from 6 to 20 carbons, alkaryl of from 7 to 20 carbons, cycloalkyl of from 5 to 20 carbons, and alkyl-substituted cycloalkyl of from 6 to 20 carbons; and, when both $m$ and $n$ are 0, $R^1$ and $R^2$, when taken together, form a divalent group selected from the group consisting of dicarboxylic acid anhydride, dicarboximide, and N-alkyldicarboximide having from 1 to 20 carbons in the alkyl group thereof, and (c) a mono-olefinically-unsaturated polymerizable monomer, said monomer consisting of a $>C=C<$ group having at least one carbon atom bonded to a substituent having a positive Hammett para-sigma value, there being no other source of free radicals other than those formed by said bicyclo[2.2.1]hept-2-ene and said sulfur dioxide, said sulfur dioxide and said bicyclo[2.2.1]hept-2-ene being contacted at a temperature of from −40° C. to 100° C. for a period of time sufficient to produce said polysulfone resin.

19. The polymerization process for producing a polysulfone resin, said process being induced by a nonexternal source of free radicals which comprises contacting (a) sulfur dioxide, (b) a bicyclo[2.2.1]hept-2-ene of the formula:

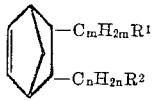

wherein each $m$ and $n$, when taken individually, is an integer having a value of from 0 to 20; each $R^1$ and $R^2$, when taken individually, is a member selected from the group consisting of hydrogen, halogen, cyano, hydroxyl, alkoxy of from 1 to 20 carbons, carboxyl, alkoxycarbonyl of from 1 to 20 carbons, alkanoyloxy of from 1 to 20 carbons, N,N-dialkylamino of from 1 to 20 carbons, amido, N-alkylamido of from 1 to 20 carbons, N,N-dialkylamido of from 1 to 20 carbons, aryl of from 6 to 20 carbons, alkaryl of from 7 to 20 carbons, cycloalkyl of from 5 to 20 carbons, and alkylsubstituted cycloalkyl of from 6 to 20 carbons; and, when both $m$ and $n$ are 0, $R^1$ and $R^2$, when taken together, form a divalent group selected from the group consisting of dicarboxylic acid anhydride, dicarboximide, and N-alkyl-dicarboximide having from 1 to 20 carbons in the alkyl group thereof, and (c) a polymerizable monomer of the formula:

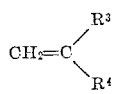

wherein $R^3$ is selected from the group consisting of hydrogen, methyl and chlorine and $R^4$ is selected from the group consisting of phenyl, chlorine, acetoxy, cyano and alkoxycarboxyl having from 1 to 12 carbon atoms in the alkoxy group thereof, there being no source of free radical other than those formed by said bicyclo[2.2.1]hept-2-ene and said sulfur dioxide, said sulfur dioxide and said bicyclo[2.2.1]hept-2-ene being contacted, at a temperature of from —40° C. to 100° C. for a period of time sufficient to produce said polysulfone resin.

20. The polymerization process for producing a polysulfone resin, said process being induced by a nonexternal source of free radicals, comprising contacting (a) sulfur dioxide, (b) bicyclo[2.2.1]hept-2-ene and (c) a mono-olefinically-unsaturated polymerizable monomer consisting of a >C=C< group having at least one carbon atom bonded to a substituent having a positive Hammett para-sigma value, there being no source of free radicals other than those formed by said sulfur dioxide and said bicyclo[2.2.1]hept-2-ene, said sulfur dioxide and said bicyclo[2.2.1]hept-2-ene being contacted at a temperature of from —40° C. to 100° C. for a period of time sufficient to produce said polysulfone resin.

21. The polymerization process for producing a polysulfone resin, said process being induced by a nonexternal source of free radicals, comprising contacting (a) sulfur dioxide, (b) bicyclo[2.2.1]hept-2-ene and (c) a polymerizable monomer of the formula:

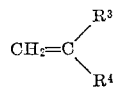

wherein $R^3$ is selected from the group consisting of hydrogen, methyl and chlorine and $R^4$ is selected from the group consisting of phenyl, chlorine, acetoxy, cyano, and alkoxycarbonyl having from 1 to 12 carbon atoms in the alkoxy group thereof, there being no source of free radicals other than those formed by said sulfur dioxide and said bicyclo[2.2.1]hept-2-ene, said sulfur dioxide and said bicyclo[2.2.1]hept-2-ene being contacted at a temperature of from —40° C. to 100° C. for a period of time sufficient to produce said polysulfone resin.

22. The process of claim 21 wherein said polymerizable monomer is styrene.

23. The process of claim 21 wherein said polymerizable monomer is methyl methacrylate.

24. The process of claim 21 wherein said polymerizable monomer is an alkyl acrylate having from 1 to 12 carbon atoms in the alkyl group thereof.

25. The process of claim 21 wherein said polymerizable monomer is ethyl acrylate.

26. The process of claim 21 wherein said polymerizable monomer is butyl acrylate.

27. The process of claim 21 wherein said polymerizable monomer is octyl acrylate.

28. The process of claim 21 wherein said polymerizable monomer is decyl acrylate.

29. The process of claim 21 wherein said polymerizable monomer is acrylonitrile.

30. The process of claim 21 wherein said polymerizable monomer is vinyl chloride.

31. The process of claim 21 wherein said polymerizable monomer is vinylidene chloride.

32. The process of claim 21 wherein said polymerizable monomer is vinyl acetate.

References Cited by the Examiner

UNITED STATES PATENTS

| | | | |
|---|---|---|---|
| 2,899,412 | 8/1959 | Caldwell et al. | 260—79.3 |
| 3,194,678 | 7/1965 | Caldwell | 260—79.3 |
| 3,220,981 | 11/1965 | MacPeek et al. | 260—79.3 |

OTHER REFERENCES

Frederick et al.: Journal Amer. Chem. Soc., vol. 56, pp. 1815–1819 (1954).

JOSEPH L. SCHOFER, *Primary Examiner.*

D. K. DENENBERG, *Assistant Examiner.*